United States Patent
Dhua et al.

(10) Patent No.: US 7,676,087 B2
(45) Date of Patent: Mar. 9, 2010

(54) METHOD FOR IDENTIFYING VEHICLES IN ELECTRONIC IMAGES

(75) Inventors: Arnab S. Dhua, Kokomo, IN (US); Yan Zhang, Kokomo, IN (US); Stephen J. Kiselewich, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 822 days.

(21) Appl. No.: 11/523,986

(22) Filed: Sep. 20, 2006

(65) Prior Publication Data

US 2008/0069402 A1 Mar. 20, 2008

(51) Int. Cl.
*G06K 9/00* (2006.01)

(52) U.S. Cl. .................. 382/170; 382/181; 382/199; 382/104

(58) Field of Classification Search .............. 382/104, 382/199, 264, 170, 181; 348/625, 607, 627, 348/521, 92, 125; 358/3.2; 347/131; 725/127
See application file for complete search history.

(56) References Cited

U.S. PATENT DOCUMENTS

| | | | | |
|---|---|---|---|---|
| 5,053,887 | A * | 10/1991 | Thompson | 358/3.2 |
| 5,588,068 | A * | 12/1996 | Longest et al. | 382/141 |
| 6,246,961 | B1 | 6/2001 | Sasaki et al. | 701/301 |
| 6,657,677 | B1 * | 12/2003 | He et al. | 348/625 |
| 6,862,368 | B1 * | 3/2005 | He et al. | 382/199 |
| 2006/0206243 | A1 | 9/2006 | Pawlicki et al. | 340/435 |
| 2006/0212215 | A1 | 9/2006 | Koulinitch | 701/96 |

OTHER PUBLICATIONS

EP Search Report dated Feb. 1, 2008.
Collado J M et al: "Model based vehicle detection for intelligent vehicles" Intelligent Vehicels Symposium, 2004 IEEE Parma, Italy Jun. 14-17, 2004, Piscataway, NJ, USA, IEEE, Jun. 14, 2004, pp. 572-577, XP010727710 ISBN: 0-7803-8310-9 figure 2 p. 572, col. 2, line 26—p. 573, col. 1, line 2 p. 573, col. 1, lines 16-18 p. 573, col. 2, line 17—p. 574, col. 2, line 15 p. 576, col. 1, lines 24-27 p. 576, col. 1, line 28—col. 2, line 2 Figure 6.
Bernd Jahne: "Digitale Bildverarbeitung" 2002, Springer Verlag, DE, Berlin, XP002465680 ISBN: 3-540-41260-3 p. 325, line 14—p. 327, line 3.

* cited by examiner

*Primary Examiner*—Anh Hong Do
(74) *Attorney, Agent, or Firm*—Jimmy L. Funke

(57) ABSTRACT

A method for identifying objects in an electronic image is provided. The method includes the steps of providing an electronic source image and processing the electronic source image to identify edge pixels. The method further includes the steps of providing an electronic representation of the edge pixels and processing the electronic representation of the edge pixels to identify valid edge center pixels. The method still further includes the step of proving an electronic representation of the valid edge center pixels. Each valid edge center pixel represents the approximate center of a horizontal edge segment of a target width. The horizontal edge segment is made up of essentially contiguous edge pixels. The method also includes the steps of determining symmetry values of test regions associated with valid edge center pixels, and classifying the test regions based on factors including symmetry.

29 Claims, 10 Drawing Sheets

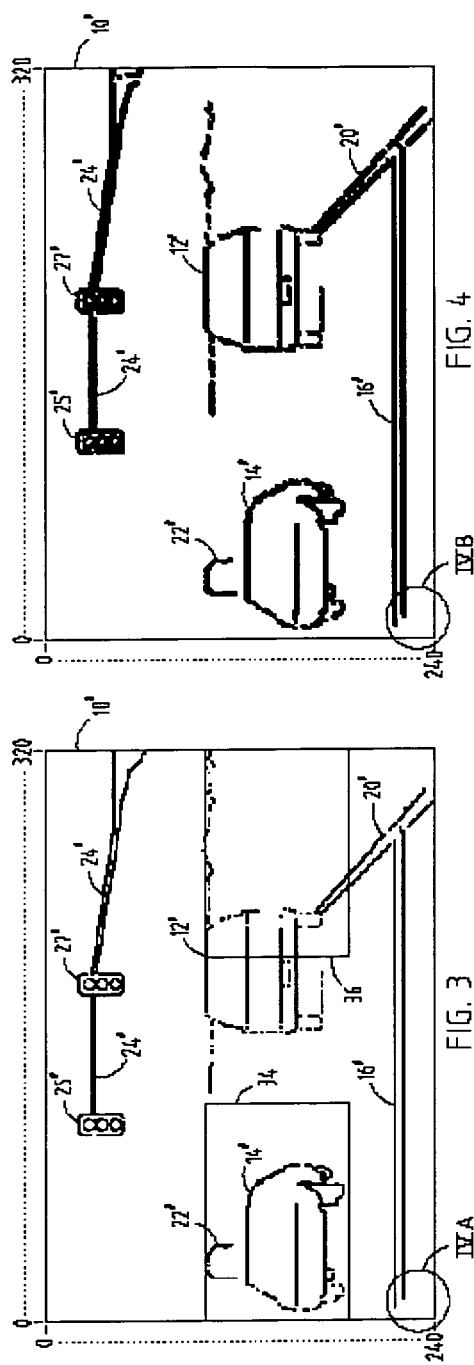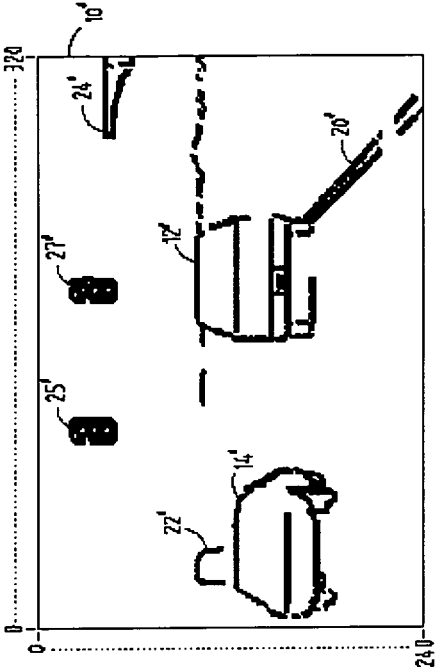

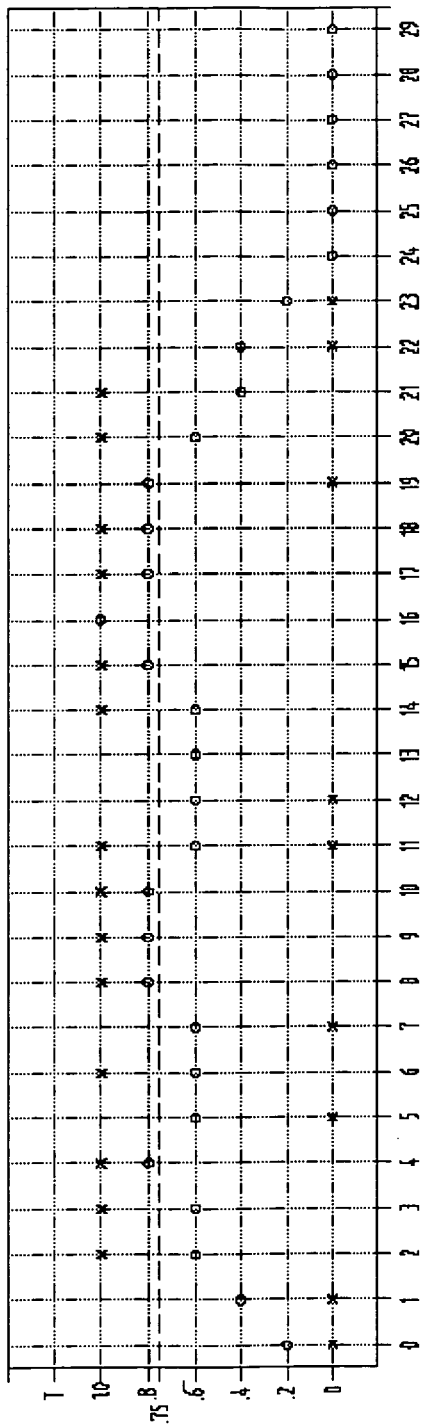

METHOD FOR IDENTIFYING VEHICLES IN ELECTRONIC IMAGES

TECHNICAL FIELD

The present invention is generally directed to electronic image processing, and more specifically, to a method for identifying the potential location of vehicles in electronic images.

BACKGROUND OF THE INVENTION

As the volume and complexity of vehicular traffic has continued to increase worldwide, so has the need for collision warning systems to help vehicle drivers avoid collisions. Examples of collision warning systems include forward collision warning systems, blind spot warning systems, lane departure warning systems, intersection collision warning systems, and pedestrian detection systems. Typically, many of these systems employ radar sensors, or a combination of radar and vision sensors to perform vehicle detection and recognition.

One problem typically associated with a "radar only" approach to vehicle detection is multiple false positives, which is the indication of the presence of a vehicle in an area when no vehicle is actually present in that area. Another problem with "radar only" systems is that the placement of bounding boxes, which typically are designed to indicate the approximate location and boundaries of an area containing a target vehicle, can be imprecise. Some designers have attempted to address these shortcomings by combining radar with vision sensors, often using the radar as a cueing system to locate potential vehicle areas and provide located potential vehicle areas to a vision-based portion of the sensor to complete processing and identify the vehicles. While this approach can be effective, it has the disadvantage of requiring both radar hardware and vision/camera hardware, adding expense to the system.

What is needed is a fast cueing video-only system for detecting and identifying regions of interest that are potential vehicles and/or objects in an input image frame, and passing region of interest information on to additional processing circuitry for classification and processing.

SUMMARY OF THE INVENTION

In accordance with one aspect of the present invention, a method for identifying objects in an electronic image is provided. The method includes the steps of providing an electronic source image that has been generated with an array of pixels, and electronically processing the electronic source image to identify edge pixels of the electronic source image. The method further includes the steps of providing an electronic representation of the edge pixels, and processing the electronic representation of the edge pixels to identify valid edge center pixels. Each valid edge center pixel represents the approximate horizontal center of a horizontal edge segment having a target width. The horizontal edge segment is made up of essentially contiguous edge pixels. The method further includes the step of providing an electronic representation of valid edge center pixels.

In accordance with another aspect of the present invention, a method for identifying features in an electronic image is provided. The method includes the steps of providing an electronic source image generated with an array of pixels, and processing the electronic source image to identify edge pixels. The method further includes the steps of determining which of the edge pixels are target edge pixels at the approximate center of horizontal edge segments having a target width and including essentially contiguous edge pixels. The method further includes the steps of determining symmetry values for test regions in the electronic source image that correspond to target edge pixels. The size of the test regions is a function of the row in which the corresponding target edge pixels are located. The method still further includes the steps of comparing the symmetry values of test regions corresponding to a segment of essentially contiguous edge pixels having a target width to identify the test region having the highest symmetry, and classifying test regions having the highest symmetry to identify test regions of interest.

In accordance with yet another aspect of the present invention, a method for identifying potential vehicle regions in an electronic image is provided. The method includes the steps of providing a source image generated by an array of pixels that includes at least one vehicle to be detected, and electronically processing the source image to provide an edge image comprising edge pixels. The method further includes the steps of removing edges from the edge image that are angled by a predetermined amount relative to horizontal, and vertically thickening edges of the edge image. The method still further includes the steps of removing edges from the edge image that are longer than a maximum length, and identifying potential vehicle base edges in a row of the edge image.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 3 is a pictorial representation generally illustrating the array of pixels of FIG. 2 after certain angled lines have been removed, according to one embodiment of the present invention;

FIG. 4 is a pictorial representation generally illustrating the array of pixels of FIG. 3 after the array has been processed to vertically thicken edges, according to one embodiment of the present invention;

FIG. 5 is a pictorial representation generally illustrating the array of pixels of FIG. 4 after certain lines have been removed, according to one embodiment of the present invention;

FIGS. 6A-6D are graphical representations of input, output and filter values associated with a filter employed in the method, according to one embodiment of the present invention;

DESCRIPTION OF THE PREFERRED EMBODIMENTS

Figure 1:
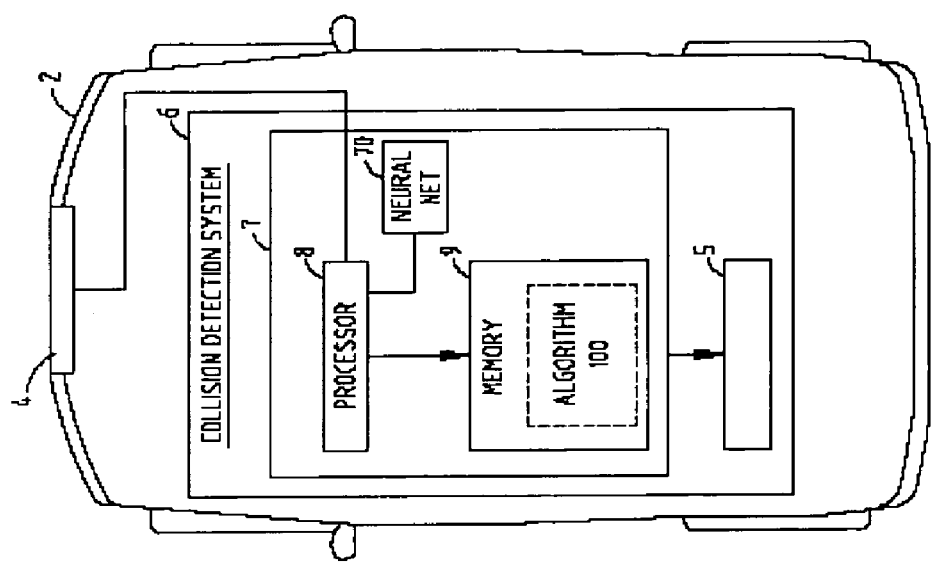
FIG. 1 is a graphical representation of a collision detection system including a system for identifying vehicles in electronic images, according to one embodiment of the present invention.

FIG. 1 generally illustrates a vehicle 2 having a camera 4 coupled to a collision detection system 6, according to one embodiment of the present invention. The camera 4 is shown located in a forward location of the vehicle 2, and is configured to provide electronic images of a view to the front of the vehicle 2 to the collision detection system 6. Collision detection system 6 is shown including a detection system 7 configured to identify potential vehicle locations in the images provided to collision detection system 6 by camera 4. Detection system 7 includes a processor 8 coupled to memory 9 and a neural network 70. Memory 9 includes an algorithm, such as, for example, the algorithm 100 (discussed below) that is executed by processor 8 to cause detection system 7 to identify potential vehicle locations in the electronic images provided to collision detection system 6 by camera 4. As shown, detection system 7 is coupled to additional processing circuitry 5. Detection system 7 provides information about potential vehicle locations to additional processing circuitry 5, which uses the information to identify actual vehicle locations, and alert drivers of vehicle 2 to potential collisions. Although detection system 7 is shown employing a processor 8 and memory 9 executing an algorithm 100 to detect potential vehicles, it should be appreciated that in alternate embodiments, the potential vehicle detection algorithm could be implemented in software located in a microcontroller, or could be implemented in hardware circuitry, or using discrete electronic components.

Figure 1A:
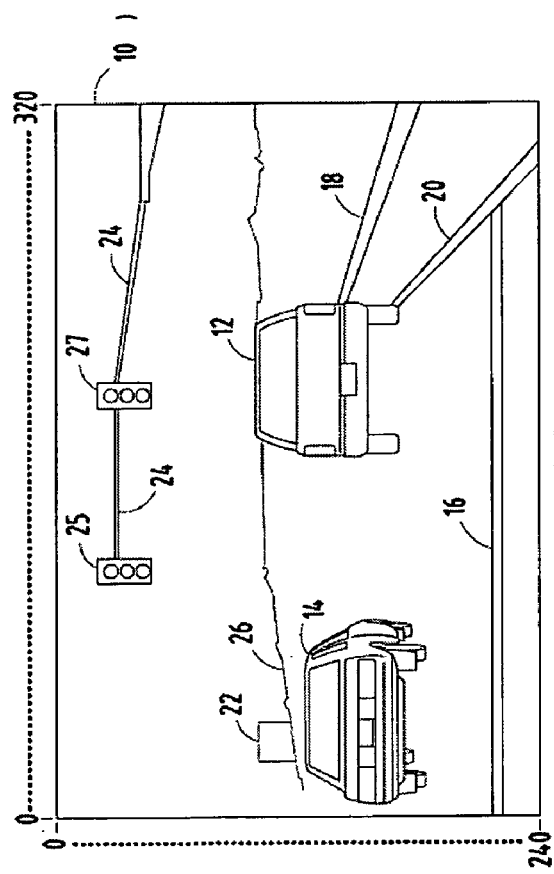
FIG. 1A is a pictorial representation of an electronic source image containing objects to be detected.

Referring to FIG. 1A, an electronic image 10 of vehicles on a road is generally illustrated. In one exemplary embodiment, the electronic image 10 is provided by a camera 4 of the vehicle 2 generally illustrated in FIG. 1, and is provided to a detection system 7 configured to implement a detection algorithm 100 discussed below. In the present embodiment, the electronic image 10 includes a passenger car 14 and a truck 12 traveling on a roadway. The electronic image 10 also includes a horizon 26, a building 22, roadway lines 16, 20, and 18, and traffic lights 25 and 27 supported by beams 24. As shown, the image 10 is a digital electronic image that is a frame taken from a stream of image frames provided by a video camera facing in a forward direction in a following vehicle (not shown). In an alternate embodiment, electronic image 10 is a digital electronic image provided by a device other than a digital video camera, such as, for example, a digital still camera or a computer or other electronic image sensor. In yet another alternate embodiment, electronic image 10 is an analog image.

Figure 2:
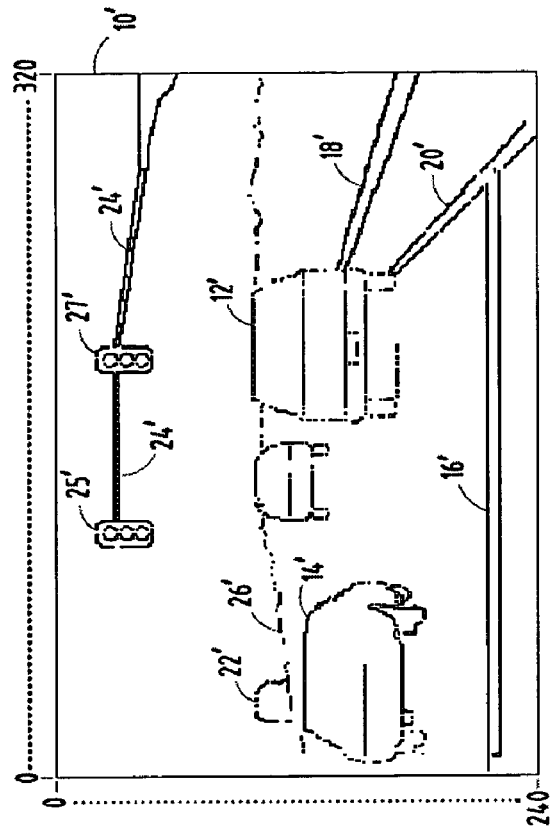
FIG. 2 is a pictorial representation generally illustrating the image of FIG. 1 after it has been processed to provide an array of pixels representing image edges, according to one embodiment of the present invention.

Referring to FIG. 2, a digital edge image 10', derived from the electronic image 10 generally illustrated in FIG. 1 in a first step of the method, is shown. Digital edge image 10' is a two-dimensional electronic representation of the edges of objects generally illustrated in electronic image 10 of FIG. 1. The edges have been detected in electronic image 10 using a standard edge detection method. In the present embodiment, the edges generally illustrated in digital edge image 10' have been detected in electronic image 10 using a Canny edge detection algorithm. As shown, items 12', 14', 16', 18', 20', 22', 24', 25', 26', and 27' are edges of items 12, 14, 16, 18, 20, 22, 24, 25, 26, and 27 of electronic image 10 of FIG. 1 that have been detected by the standard Canny edge detection algorithm. It should be appreciated that in an alternate embodiment, a standard edge detector other than a Canny edge detector may be used to detect the important edges of items in electronic image 10 of FIG. 1 to provide digital edge image 10' of FIG. 2. In the present embodiment, a smoothed version of the electronic image 10 is created by the edge detection algorithm, and is employed in a symmetry detection process, discussed later.

The edges of the items 12'-27' generally illustrated in FIG. 2 are each made up of individual pixels. As shown in the exemplary image 10' of FIG. 2, the image is a two-dimensional matrix of individual pixels, with each pixel having a horizontal location between 0 and 320, and a vertical location between 0 and 240. In FIG. 2, each individual pixel is identified as either an edge pixel (shown in black), or a non-edge pixel (shown in white). As shown, the digital edge image 10' of FIG. 2 is 320 pixels wide by 240 pixels deep. In an alternate embodiment, the digital edge image 10' of FIG. 2 has a different width and/or depth. It should be appreciated that if the original image 10 of FIG. 1, in an alternate embodiment, is a non-digital image, image 10 is converted into digital form prior to detecting the edges using a standard edge detector. As shown in FIG. 2, the origin of the digital edge image 10' of FIG. 2 is located in the upper left-hand corner of digital edge image 10'.

FIG. 3 generally illustrates digital edge image 10' after a second step of the method has been completed in which angled edges in certain areas of digital edge image 10' have been removed. More specifically, in this second step of the method, two areas 34 and 36 are defined. As shown, the top of areas 34 and 36 are located approximately 100 pixels from the top of digital edge image 10'. The left edge of area 34 is located at approximately pixel 0, while the rightmost edge of area 36 is located at approximately pixel 320. Each area is approximately 100 pixels wide, and has a height of approximately 80 pixels. In the second step of the method, angled lines having an angle greater than 5 degrees and less than 20 degrees from horizontal, and having a length that traverses at least approximately 65% of the width of areas 34 or 36 have been removed. More specifically, the portion of horizon 26' of FIG. 2 lying within area 34 has been removed, as has the portion of line 18' of FIG. 2 lying within area 36. It should be appreciated that in alternate embodiments, lines having an angle of between 3 and 25 degrees relative to horizontal, and occupying at least 60% of the width within either of areas 34 and 36, are removed. In still another alternate embodiment, area 34 has a height of between 60 and 80 pixels, a width between 90 and 110 pixels, and is located horizontally between pixels 0 and 110, and vertically between pixels 100 and 180. In still another alternate embodiment, area 36 has a width of between 90 and 110 pixels, a height of between 60 and 80 pixels, and is located horizontally between pixels 210 and 320, and vertically between pixels 100 and 180. It should be appreciated that in yet another alternate embodiment, more or fewer than two areas 34 and 36 may be utilized to identify areas in which angled edges are removed, and that areas 34 and 36 may have sizes and locations other than those described above.

Figure 4A:
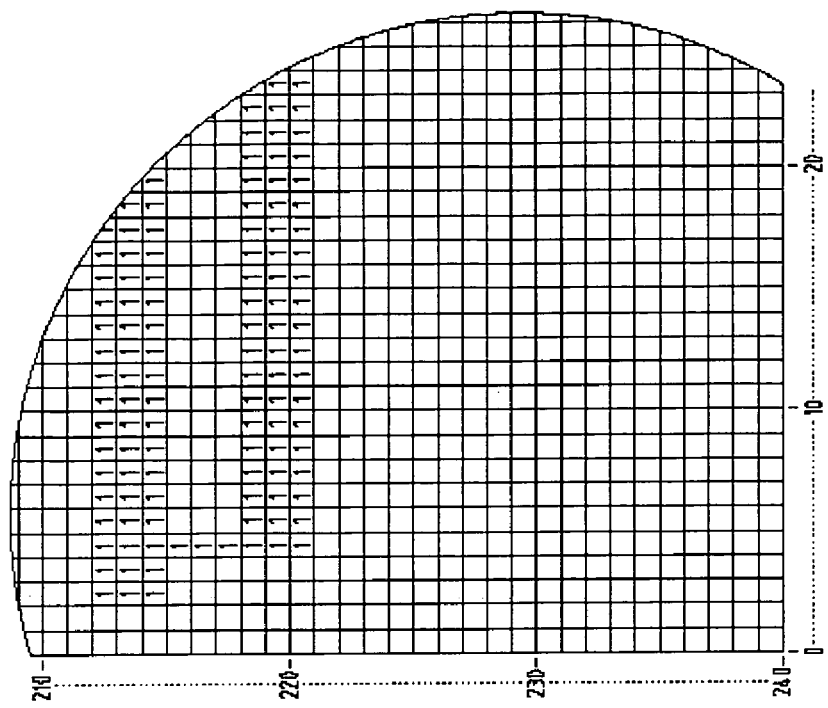
FIG. 4A is an enlarged view of the pixels making up section IV A of FIG. 3, according to one embodiment of the present invention.
Figure 4B:
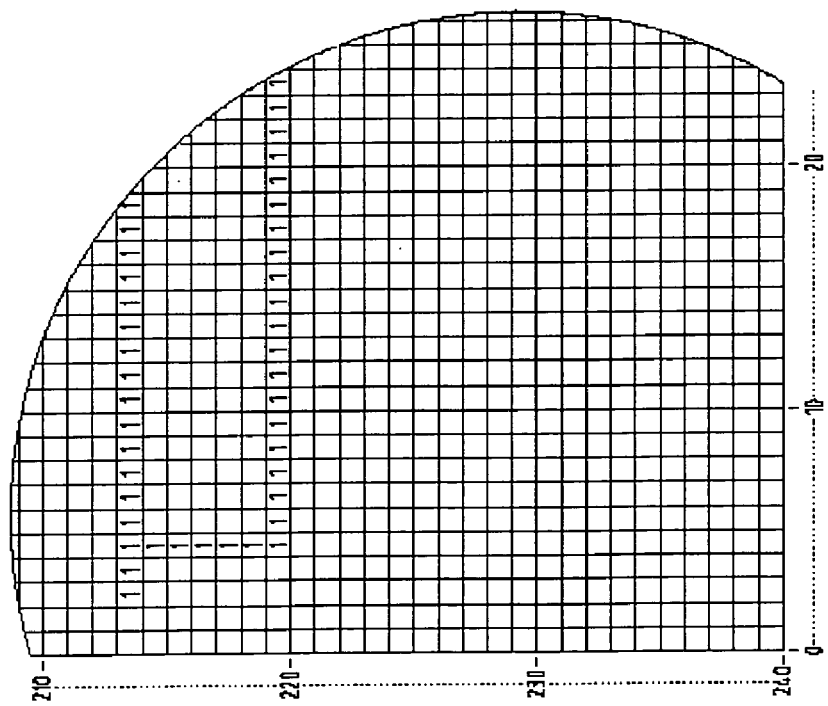
FIG. 4B is an enlarged view of section IV B of FIG. 4 after the array of pixels has been processed to vertically thicken edges, according to one embodiment of the present invention.

FIG. 4 generally illustrates digital edge image 10' after edges remaining after the step generally illustrated in FIG. 3 have been vertically thickened in a third step of the method. FIGS. 4A and 4B generally illustrate the edge thickening process. FIG. 4A is a close-up view of a section taken from the lower left-hand corner of the digital edge image 10' generally illustrated in FIG. 3. Edges in FIG. 4A are represented by a 1 in each pixel that is part of the edge, while non-edges are represented by a blank in a pixel location. In the line thickening step of the method, the pixels immediately above and below each edge pixel of the digital edge image 10' of FIG. 3 are caused to become edge pixels if they are not already edge pixels. FIG. 4B provides a close-up view of the thickening process as applied to the edge pixels generally illustrated in FIG. 4A. As shown, the pixels immediately above and below each edge pixel generally illustrated in FIG. 4A have been converted into edge pixels, resulting in each horizontal edge of the digital edge image 10' of FIG. 3 being thickened. The results of the thickening step are illustrated in FIG. 4.

FIG. 5 generally illustrates the digital edge image 10' of FIG. 4 after a fourth processing step has removed horizontal edges exceeding predetermined lengths from the digital edge image 10' generally illustrated in FIG. 4. In this step, the remaining horizontal edges in each individual row of digital image edge 10' of FIG. 4 are processed to determine if each horizontal edge exceeds a predetermined length. If a horizontal edge exceeds a predetermined length, that horizontal edge is removed from digital edge image 10' of FIG. 4. The resulting digital edge image 10' is illustrated in FIG. 5. The predetermined length used to determine which horizontal edges are removed is a function of the row in which the horizontal edge is located. The predetermined lengths in rows closer to the bottom of digital edge image 10' of FIG. 4 are longer than the predetermined lengths of rows closer to the top of digital edge image 10' of FIG. 4. The predetermined length for each row is itself a function of the expected width of a vehicle appearing in that row of digital edge image 10', and is approximately equal to 2.5 to 3 times the expected width of a vehicle in a given row.

Figure 11:
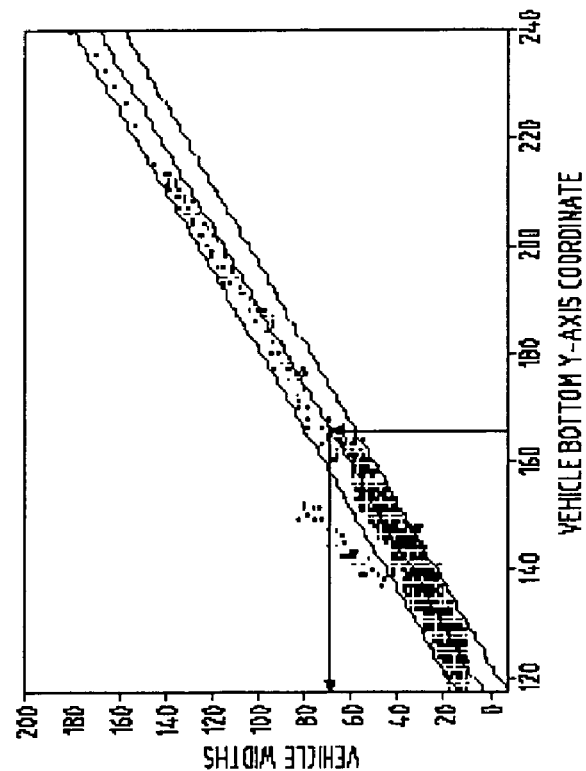
FIG. 11 is a graph generally illustrating the relationship between expected vehicle width and pixel location in an image, according to one embodiment of the present invention.

The graph shown in FIG. 11 generally illustrates the expected widths of vehicles found in a given row based on the Y axis coordinate of the given row. For example, a vehicle located in a row that has a Y axis coordinate of 160 (in other words, 160 pixels from the top of the digital edge image 10' of FIG. 4) would have an expected width of approximately 60 pixels. In the step of the method generally illustrated in FIG. 5, lines in a row of digital edge image 10' that are more than three times longer than an expected vehicle width in that row are removed from digital edge image 10'. As can be seen in FIG. 5, lines 16' and beams 24' have been removed from digital edge image 10' generally illustrated in FIG. 4 because they exceed the predetermined length of three times the expected width of a vehicle in the rows in which they are located. It should be appreciated that in alternate embodiments, the predetermined length used to determine which edge segments are removed may be greater than or less than three times the expected vehicle width.

Figure 6:
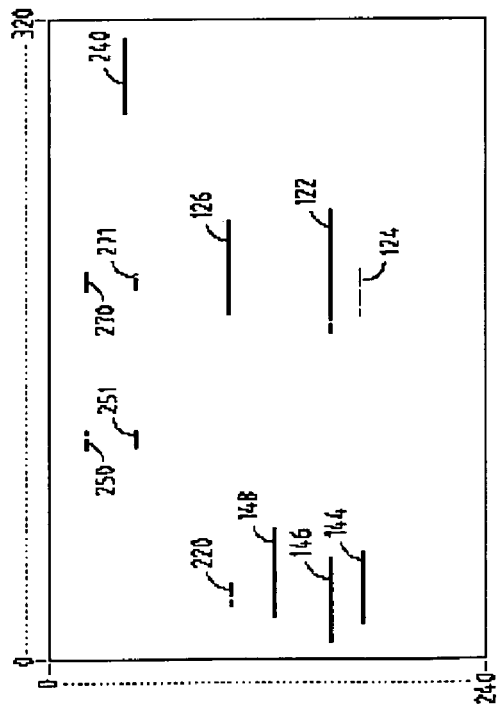
FIG. 6 is a pictorial representation generally illustrating valid edge center pixels remaining in the array of pixels of FIG. 5 after the array of pixels of FIG. 5 has been filtered, according to one embodiment of the present invention.

FIG. 6 generally illustrates digital edge image 10' after the digital edge image 10' generally illustrated in FIG. 5 has been processed using a sized edge filter in a fifth step of the method. The result of this process is a set of pixels appearing as line segments 122, 124, 126, 144, 146, 148, 220, 240, 250, 251, 270, and 271 in FIG. 6. Each pixel of each of these line segments is a valid edge center pixel that is at the approximate horizontal center of a horizontal edge segment in digital edge image 10' of FIG. 5 having a width that is equal to the expected width of a vehicle in the row in which the horizontal edge segment is located. Each horizontal edge segment is made up of essentially contiguous edge pixels. The horizontal edge segments represented by the valid edge center pixels shown in the line segments of FIG. 6 represent potential vehicle locations in the digital edge image 10' of FIG. 5.

FIGS. 6A-6D provide additional detail about the sized edge filter and process used to identify valid edge center pixels in the present embodiment. FIG. 6A is a graph representing the inputs and outputs of the sized edge filter. The Xs shown in FIG. 6A represent the value of each pixel 0 through 29 in a given row of a hypothetical edge image 10' (not shown). Xs having a value of 0 on the Y axis of FIG. 6A represent pixels that are not edge pixels. For example, pixels 0 and 1 are not edge pixels. Pixels having a value of 1 on the Y axis, designated by an X placed in the 1 row, are edge pixels. For example, pixels 2, 3, and 4 of FIG. 6A are edge pixels. It can be seen from FIG. 6A that each pixel 0 through 29 of the hypothetical digital edge image has a value of either 0 or 1, and is therefore either an edge pixel or a non-edge pixel.

FIG. 6B is another representation of the value of pixels 0 through 29 of hypothetical digital edge image 10'. As discussed with respect to FIG. 6A, pixels 0 and 1, designated P0 and P1, have a value of 0, and are therefore non-edge pixels. Pixels 2, 3, and 4, designated P2, P3, and P4, have a value of 1, and are therefore edge pixels.

FIG. 6C is a graphical representation of a sized edge filter that is applied to each of pixels P0 through P29 generally illustrated in FIGS. 6A and 6B. As shown, the sized edge filter generally illustrated in FIG. 6C has a width of 5 pixels. In the present embodiment, the sized edge filter has a width corresponding to the expected width of a vehicle in the given row to which the specific sized edge filter is applied. For example, a vehicle located in the row of hypothetical edge image 10' in which pixels 0 through 29 generally illustrated in FIGS. 6A and 6B are found would have an expected width of 5 pixels. As noted above, the expected width of vehicles in rows of the digital edge image that are closer to the bottom of the digital edge image will be wider, while the expected width of vehicles closer to the top of the digital edge image will have expected widths that are smaller in terms of pixels. As shown in FIG. 6C, the value of each cell in the sized edge filter is equal to 1 divided by the pixel width of the sized edge filter. Because the width of the filter generally illustrated in FIG. 6C is 5 pixels, the value in each cell of the filter is $\frac{1}{5}$.

In this step of the method, the filter is applied to each pixel in the selected row in the following manner. First, the center cell of the filter is aligned with the pixel to which the filter is to be applied. Next, each pixel adjacent to a filter cell is multiplied by the corresponding adjacent cell in the filter, with the product of the multiplication being added together to provide an output of the filter. More specifically, to obtain the result of applying the filter to the first pixel P0, the center of the filter will be aligned with P0, the cell to the right of the center of the filter will be aligned with P1, and the cell that is two cells to the right of the center of the filter will be aligned with P2. Next, each pixel is multiplied by the value of the corresponding filter cell. In this case, because P0 and P1 are both equal to 0, the product of the multiplication of the filter value times those cell values will be 0. Because the value of the pixel P2 is 1, the product of the multiplication of P2 times the filter will be ⅕. As a result, the sum of the total output of the filter applied to pixels P0, P1, and P2 will be ⅕, or 0.2, as is generally illustrated in cell F0 of FIG. 6D.

FIG. 6D generally illustrates the output provided by applying the filter illustrated in FIG. 6C to each pixel P0 through P29 illustrated in FIG. 6B. Filter outputs F0 through F29 are also shown on the graph in FIG. 6A, as circled above the pixel to which they correspond. FIG. 6A also includes a threshold line located at 0.75 on the vertical axis. As can be seen in FIG. 6A, some of the points F0 through F29 lie above the threshold line, while others lie below the threshold line. For example, the output of the filter, as applied to pixel P4, has a value of 0.8 (shown as F4 in FIGS. 6D and 6A), which is above the 0.75 threshold line. However, the output of the filter applied to pixel 5 has a value of 0.6 (shown as F5 in FIGS. 6D and 6A), which falls below the 0.75 threshold line. Pixels having a value higher than the threshold line after the application of the sized edge filter are referred to as valid edge center pixels. These valid edge center pixels are also denoted in FIG. 6A by horizontal lines in the line T on the vertical axis of the graph in FIG. 6A. These valid edge center pixels represent locations that have the potential to be the center pixels of the horizontal lines in the digital edge image that have the expected width of a vehicle in the row in which the horizontal line and edge pixel are located.

According to the present embodiment, a sized edge filter, as described above, is applied to each row of the digital edge image 10' of FIG. 5 to determine which of the pixels in the digital edge image 10' qualify as valid edge center pixels. The result of the application of the sized edge filter to the digital edge image 10' of FIG. 5 is generally illustrated in FIG. 6.

Figure 7:
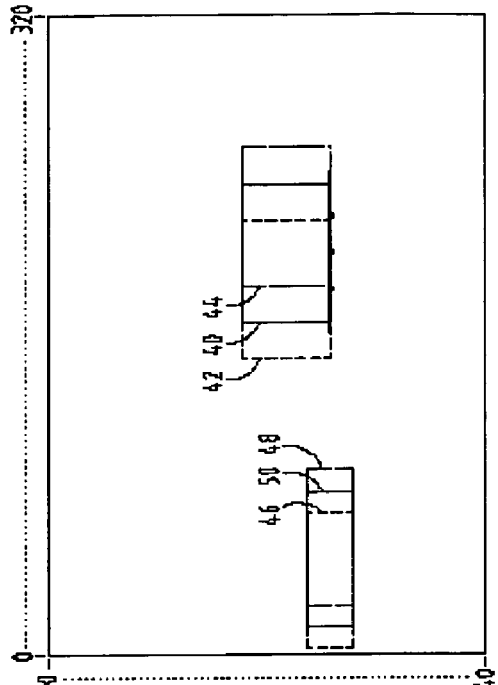
FIG. 7 is a graphical representation of several test regions associated with valid edge center pixels of FIG. 6, according to one embodiment of the present invention.

In a sixth step of the method, test regions are associated with each valid edge center pixel identified in the previous step. FIG. 7 generally illustrates examples of test regions 40, 42, and 44, and 46, 48, and 50 defined in the sixth step of the method, and associated with valid edge pixels on lines 122 and 144, respectively, of FIG. 6. Although only six test regions are illustrated in FIG. 7, it should be appreciated that in the present embodiment, a test region exists for each valid edge center pixel identified as an output of the sized edge filter, and generally illustrated as line segments in FIG. 6. The size of each test region is a function of the row in which the valid edge center pixel associated with the test region is located. The width of each test region is equal to the expected width of a vehicle in the row in which the valid edge center pixel associated with a given test region is located. The height of each test region is a percentage of its width, and consequently, varies depending on the row in which the valid edge center pixel associated with a given test region is located. In the present embodiment, the height is determined by dividing the expected vehicle width by an aspect ratio of 1.2. In alternate embodiments, the height is determined by dividing the expected vehicle width by an aspect ratio of other than 1.2. It should be appreciated that each test region encloses an area.

In the present embodiment, the test regions are rectangular in shape. In alternate embodiments, the test regions may be other than rectangular in shape.

Figure 8:
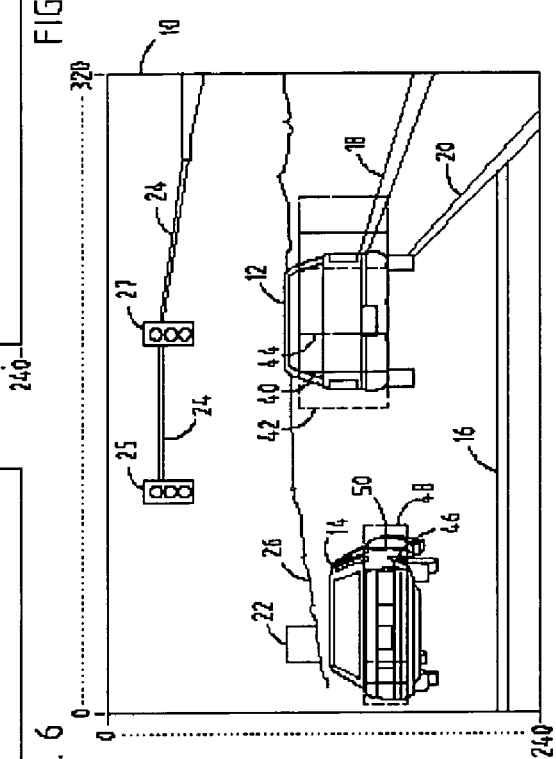
FIG. 8 is a graphical representation of the test regions of FIG. 7 superimposed on the source image generally illustrated in FIG. 1, according to one embodiment of the present invention.

FIG. 8 generally illustrates a seventh step of the method in which the symmetry in the source image of areas corresponding to each test region identified in the previous step is determined. In the present embodiment, a two-dimensional filter is used to determine the symmetry of the test regions. In addition, in the present embodiment, the symmetry detection is performed on a high-pass filtered version of the source image, rather than on the source image itself. After the completion of the seventh step of the method, each test region has a symmetry value associated with it. In the present embodiment, the symmetry values are used to classify the test regions in later steps of the method.

Figure 8C:
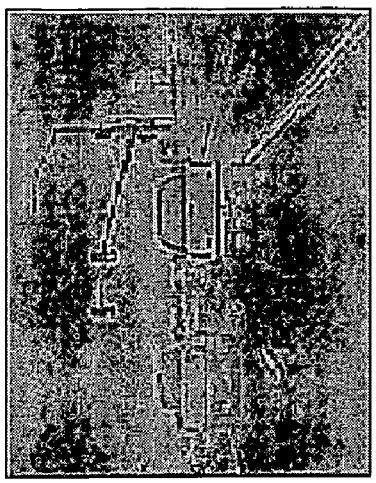
FIGS. 8A-8F are graphical representations of images associated with a symmetry detection step, according to one embodiment of the present invention.
Figure 8E:
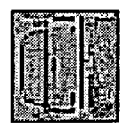
Figure 8F:
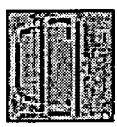
Figure 8B:
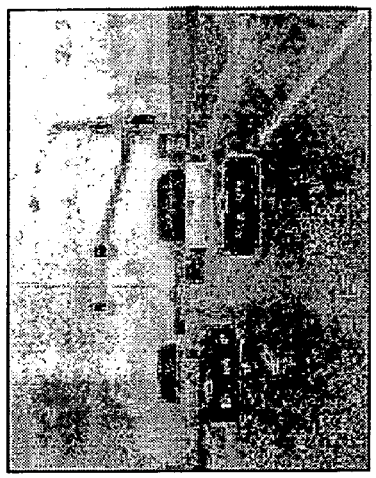
Figure 8D:
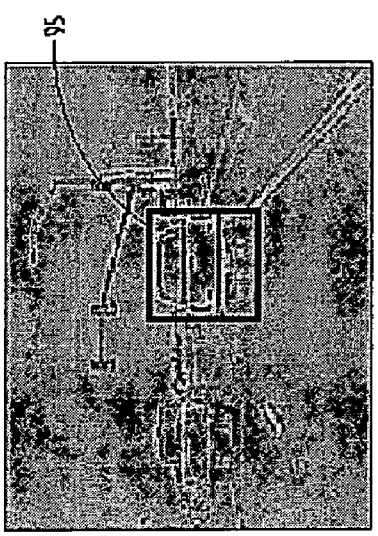
Figure 8A:
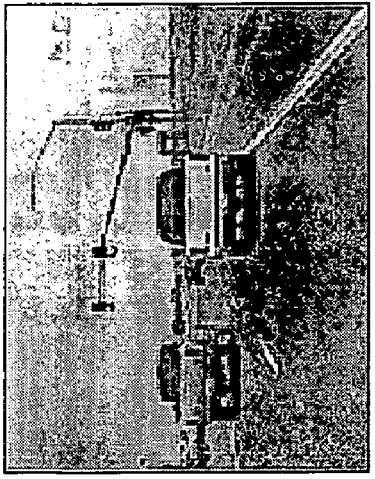

FIGS. 8A-8F provide additional detail regarding the symmetry detection process of the seventh step of the method, according to one embodiment of the present invention. FIG. 8A represents a source image of a traffic scene including two light trucks. FIG. 8B represents a smoothed version of the source image of FIG. 8A. In the present embodiment, the smoothed version shown in FIG. 8B is created as part of the edge detection process performed on a source image and discussed above. In an alternate embodiment, the smoothed version of the source image may be created independently of the edge detection process. The smoothed version shown in FIG. 8B is subtracted from the source image shown in FIG. 8A to provide a high-pass filtered image, also referred to as a zero-mean image, generally illustrated in FIG. 8C. In the present embodiment, the subtraction occurs on a pixel-by-pixel basis. In other words, the high-pass filtered image is created by subtracting the value of each pixel in the smoothed version of an image, such as that shown in FIG. 8B, from the value of each corresponding pixel in the corresponding source image, such as that shown in FIG. 8A. One property of the resulting high-pass filtered image is that every sub-region within the image has a mean pixel value that tends to zero. In other words, taking the sum of all the pixel values in any randomly selected region in the high-pass filtered image and dividing the sum by the number of pixels in the region will result in a number that is close to zero. For this reason the high-pass filtered image generally illustrated in FIG. 8C is also referred to as a zero-mean image.

The resulting zero mean image is next used to calculate symmetry values for the test regions identified in earlier steps of the method. FIG. 8D generally illustrates a hypothetical test region 95 in the zero-mean image of FIG. 8C for which a symmetry value is to be determined. The characteristics and locations of the actual test regions for which symmetry values are to be determined is discussed above with respect to step six of the method. For purposes of illustration, it is assumed that test region 95 is a test region for which a symmetry value is to be determined. FIG. 8E generally illustrates the test region 95 that has been selected. To determine a symmetry value for a given test region, a left-to-right mirror image of the test region is first created. FIG. 8F generally illustrates a left-to-right mirror image of the test region 95 of FIGS. 8D and 8E. In one embodiment of the present invention, a left-to-right mirror image of a test region is provided by processing the test region row-by-row and writing the pixels of each row in reverse order.

Once a mirror image of a selected test region has been created, the test region is filtered using the mirror image in order to obtain a symmetry value for the selected test region. The symmetry value is determined by processing the selected test region and mirror image of the test region on a pixel-by-pixel basis. Each pixel of the test region is multiplied by the corresponding pixel of the mirror image, and the sum total of all the multiplied pixel values of the test region is determined. This sum total is than normalized by dividing the sum total by a normalization factor that is a function of the size of the test region for which the symmetry value is being determined. In the present embodiment, the normalization factor is determined by multiplying each pixel of the mirror image by itself to provide a mirror pixel product for each pixel location in the mirror image, and determining the sum of the mirror pixel products. The resulting normalized sum provided by dividing the sum total by the normalization factor is the symmetry value for the test region. In the present embodiment, the resulting symmetry value is a number between 0 and 1, with 0 indicating that the test region is not symmetrical, and 1 indicating that the test region is perfectly symmetrical. It should be appreciated that by dividing the sum total of the multiplied pixel values by the normalization factor to determine symmetry values for various test regions, symmetry values for test regions of various sizes can be meaningfully compared to each other without having the comparisons distorted because of the varying test region sizes.

Figure 9:
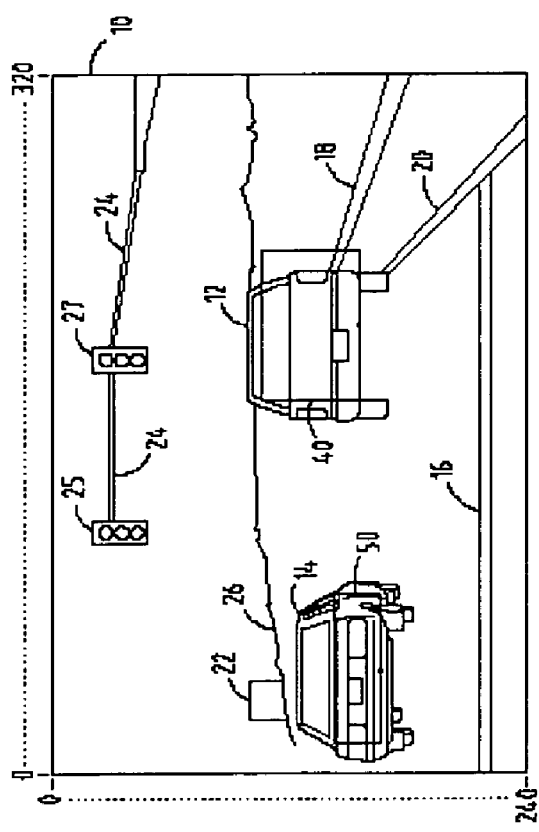
FIG. 9 is a graphical representation of selected regions of interest of FIG. 8 superimposed on the source image generally illustrated in FIG. 1, according to one embodiment of the present invention.

Once the symmetry for each test region has been determined, the symmetry of test regions associated with valid edge center pixels that are part of the same horizontal line generally illustrated in FIG. 6 are compared in an eighth step of the method to determine which test region associated with each horizontal line has the highest symmetry. FIG. 9 generally illustrates selected regions 40 and 50, which have been selected as having the highest symmetry of all the test regions for horizontal lines 122 and 144, respectively, of FIG. 6. As shown, the test region 40 approximates the outline of the rear of truck 12, while the test region 50 approximates the outline of the rear of passenger vehicle 14. Information about each selected test area, also referred to as a potential region of interest, is stored in a digital format. The stored information associated with each potential region of interest includes the symmetry of the selected test area, and the location of the valid edge center pixel associated with the selected test area.

In a ninth step of the method, the stored potential region of interest information is used to evaluate and classify, on a row-by-row basis beginning with the row in the image that is closest to the bottom of the image, each of the areas in the source image corresponding to a potential region of interest. As each potential region of interest is evaluated, it is classified as a strong region of interest, a weak region of interest, or a non-region of interest. This classification is accomplished by evaluating characteristics of the region in the source image, such as, for example, the symmetry of the region, the entropy of the region, the edge density of the region, and various combinations of the ratio of horizontal and vertical edges to the total number of edge pixels. Once a strong region of interest has been identified in a given row of the source image, potential regions of interest in the source image located above that identified strong region of interest are not further processed or classified.

Figure 9A:
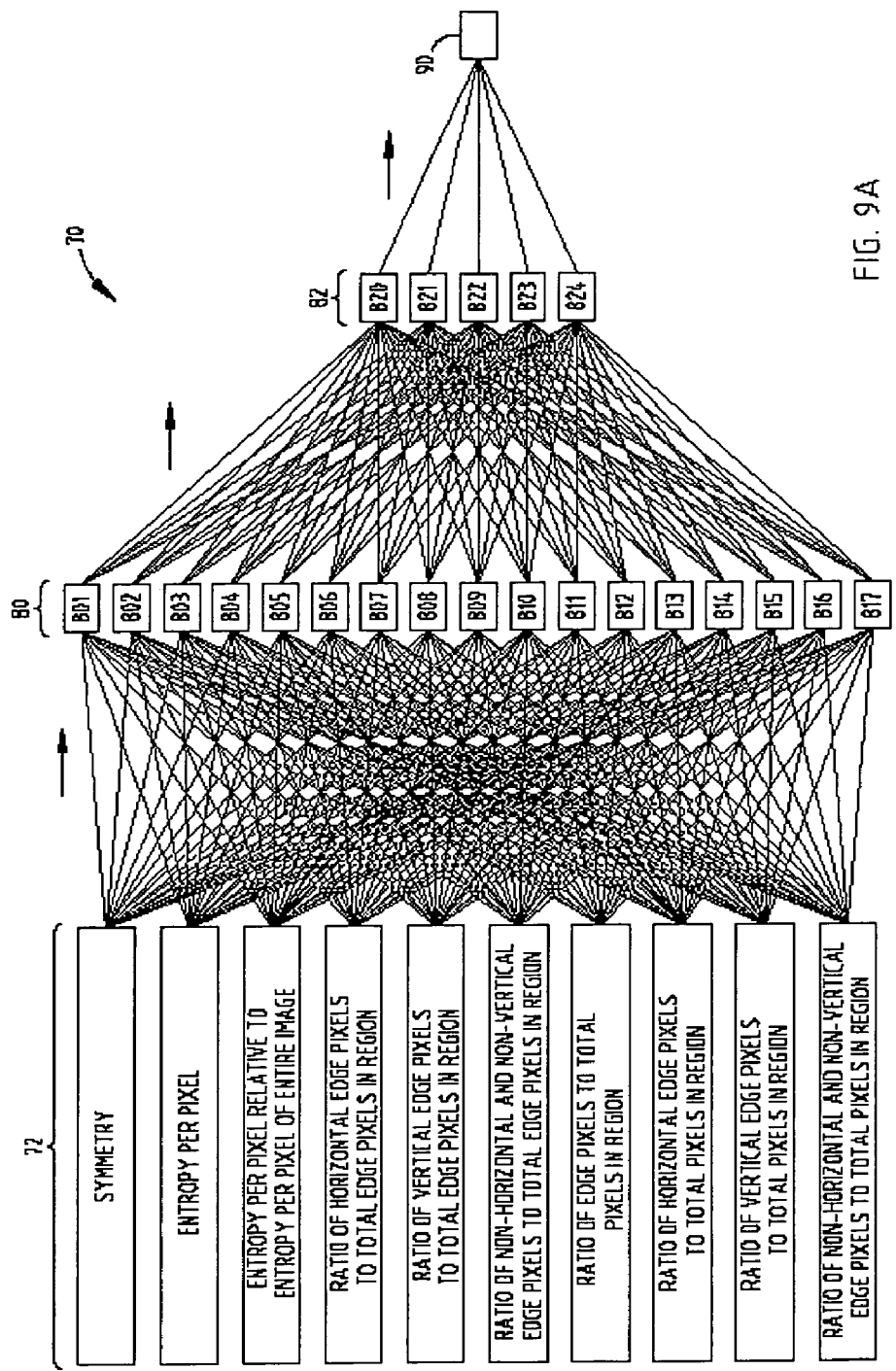
FIG. 9A is a block diagram of a neural network associated with a classification step, according to one embodiment of the present invention.

In the present embodiment, classification is accomplished by a neural network, generally illustrated in FIG. 9A. In an alternate embodiment, classification is accomplished by other electronic circuitry, such as, for example, a microcontroller executing a software algorithm. Referring to FIG. 9A, a neural network 70 according to the present embodiment includes two hidden layers 80 and 82. Hidden layer 80 includes 17 neurons numbered 801-817. Hidden layer 82 includes 5 neurons numbered 820-824. As shown neurons 801-817 of neural network 70 receive 10 inputs, which are used by the neural network 70 to classify each potential region of interest. The inputs used to classify a given potential region of interest include the symmetry of the potential region of interest, the entropy per pixel of the potential region of interest, the entropy per pixel of the potential region of interest relative to the entropy per pixel of the entire image, the ratio of the number of horizontal edge pixels of the potential region of interest to the total number of edge pixels in the region of interest, the ratio of the number of vertical edge pixels in the potential region of interest to the total number of edge pixels in the potential region of interest, and the ratio of the number of non-horizontal and non-vertical edge pixels in the potential region of interest to the total number of edge pixels in the potential region of interest. The inputs also include the ratio of the number of edge pixels in the potential region of interest to the total number of pixels in the potential region of interest, the ratio of the number of horizontal edge pixels in the potential region of interest to the total number of pixels in the potential region of interest, the ratio of the number of vertical edge pixels in the potential region of interest to the total number of pixels in the potential region of interest, and the ratio of the number of non-horizontal and non-vertical edge pixels in the potential region of interest to the total number of pixels in the potential region of interest. In the present embodiment, these input values to the neural network 70 are determined during the earlier steps of the method discussed above.

Each of these ten inputs is provided to each of the 17 nodes of the first hidden layer 80, and is used by the first hidden layer 80 and second hidden layer 82 to determine an overall classification number for the given potential region of interest. The output of the neural network 70, illustrated as item 90 in FIG. 9A, is a classification number having a value between 0 and 1, inclusive. In the present embodiment, the output is divided into three classes. The first class is referred to as a strong region of interest, and is characterized by a value of 1 and numbers close to one. In the present embodiment, regions having values between 0.70 and 1.00, inclusive, are characterized as strong regions of interest. The second class is referred to as a non-region of interest, and is characterized by a value of 0 and numbers close to 0. In the present embodiment, regions having values between 0 and 0.45, inclusive, are characterized as non-regions of interest. The third class is referred to as a weak region of interest, and includes values between 0 and 1 that are not characterized as a strong region of interest or a non-region of interest. In the present embodiment, regions having values between 0.45 and 0.70 are characterized as weak regions of interest.

One skilled in the art will appreciate that the neural network 70 described above can be programmed and/or trained by providing input values associated with known vehicle locations and/or regions of interest in images such that the neural network 70 develops an ability to classify regions based on various input value patterns. One skilled in the art will also recognize that the inputs provided to the various neurons of the first and second layers 80 and 82 will have various weighting factors applied to them based on the programming and/or training of the neural network.

Figure 10:
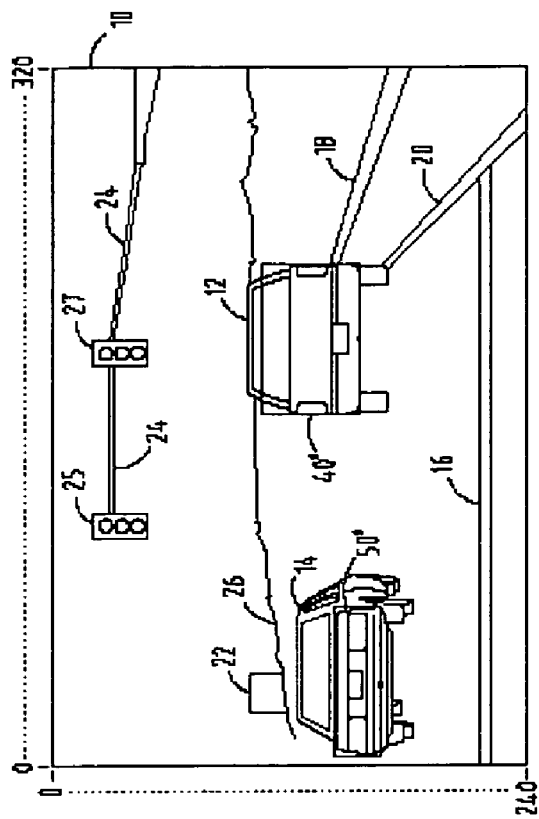
FIG. 10 is a graphical representation of refined-boundary selected regions of interest superimposed on the source image generally illustrated in FIG. 1, according to one embodiment of the present invention.

Once the potential regions of interest have been classified, the regions of interest selected as strong and weak regions of interest are further processed in a tenth step of the method, generally illustrated in FIG. 10, to refine the borders of each of the selected regions of interest. This refinement is accomplished by slightly varying the widths, heights, aspect ratios, and vertical and horizontal locations of each selected region of interest to determine if those changes alter the symmetry and/or entropy of the selected region of interest. If slight variations in the selected regions of interest increase the symmetry and/or decrease the entropy, then the slightly altered region of interest replaces the original selected region of interest. As can be seen by referring to FIGS. 9 and 10, a region of interest 50 of FIG. 9 has been slightly altered by moving it to the left to the location of region of interest 50' of FIG. 10, to better align it with the rear of the vehicle 14. In addition, region of interest 40 of FIG. 9 has been moved to the left to become region of interest 40' of FIG. 10, which better aligns with the rear of the truck 12.

In an eleventh step of the method, the size, location, and symmetry characteristics of each selected region of interest identified in the previous two steps are provided to additional processing circuitry, which evaluates the selected regions of interest and each regions associated characteristics to determine if they are indicative of the presence of the vehicle in the image.

Figure 12:
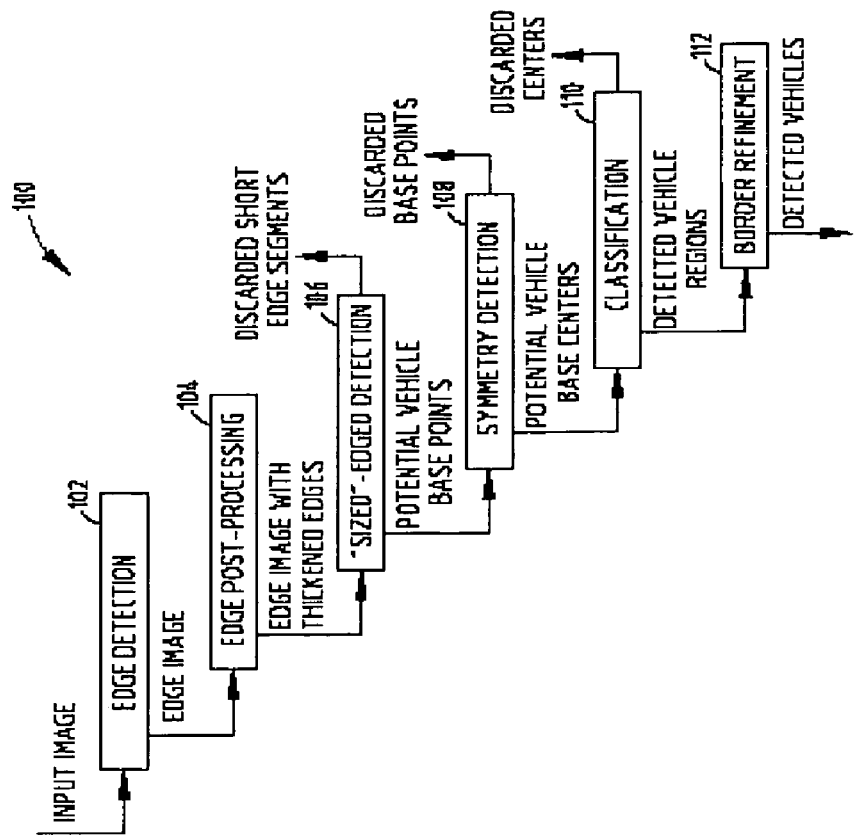
FIG. 12 is a flow chart generally illustrating a method 100 for identifying features in an electronic image, according to one embodiment of the present invention.

Referring to FIG. 12, a method 100 for identifying vehicles in an electronic image is provided. In a first step 102, an electronic image is analyzed to detect edges in the image. Edges include both horizontal edges and vertical edges. Edges are detected using any standard edge detector capable of detecting edges of a vehicle in an image. At a minimum, the edge detector is capable of detecting bottom edges of vehicles in images. The output of step 102 is a digital edge image that includes the location of edges detected in the input image. In a next step 104 of the method 100, the digital edge image is post-processed to vertically thicken horizontal edges within the image.

A third step 106 of the process is a sized edge detection step. In this step, the post-processed digital edge image is processed on a row-by-row basis to identify within each row, beginning with the bottom row, and ending at the top row, to identify portions of the edges that have edge segments that are as wide as the expected width of a vehicle located at that row in the post-processed digital edge image. The sized edge detection is accomplished using a sized edge filter that is able to detect edge segments meeting the required width criteria, even when those edge segments have missing pixels. The sized edge filter that is used is a constant edge segment of the expected vehicle width in a given row in which sized edge detection is occurring, and is normalized to sum to 1. The output of the sized edge detection step is all locations that have the potential to be the center pixel of a vehicle based on the distribution of edge pixels. These locations represent potential vehicle base points, i.e., the potential bottom of vehicles in the image.

In a next step 108 of the method 100, the output of the sized edge detection step is processed to determine the symmetry of areas associated with each potential vehicle base point. In this step, the potential vehicle base points are evaluated to determine which points satisfy certain symmetry criterion. This step is performed using the expected width of a vehicle, and begins at the bottom row of the image on a row-by-row basis. Symmetry detection is accomplished by a symmetry detector that is implemented as a two-dimensional filter. The symmetry detector is applied to a high-pass filtered version of the input image, which is created by subtracting a smoothed version of the input image from the input image itself. The size of the areas associated with potential vehicle base points for which symmetry is detected is determined based on the row in which the potential vehicle base point is located. The areas for which symmetry is detected are generally rectangular in shape, having a width that is approximately equal to the expected width of a vehicle in the image row in which corresponding potential vehicle base points are located. The height is obtained from the width by dividing the expected width by a default aspect ratio. In the present embodiment, the default aspect ratio is 1.2. The default aspect ratio is chosen to be that of a standard car so that it represents a region that would be common to most categories of vehicles had they been present at that location in the image.

The symmetry of areas associated with potential vehicle base points in a given edge in the image are compared with each other to see which area has the highest symmetry. The area having the highest symmetry is retained, while areas having lower symmetry are discarded. The results of the symmetry detection step are the locations within the image of potential vehicle base points that are associated with areas having the highest symmetry in a given edge, and represent potential vehicle base centers. In other words, these base centers and the areas associated with them represent the potential bottom of a vehicle in the image.

In a next step 110 of the method 100, the potential vehicle base centers of the previous step are classified to identify which of the potential vehicle base centers are regions of interest. A region of interest (ROI) is an area that is likely to be a vehicle in the image. This step is performed by evaluating potential vehicle base centers on a row-by-row basis, beginning at the bottom of the image, and working to the top of the image. Once a potential vehicle base center in a given row has been identified as a strong ROI, areas in the image that are located above that particular ROI are not processed. If a potential vehicle base center is identified as a weak ROI or as a non-ROI, processing in the image above those locations continues, unless and until a strong ROI is identified. The features used for classification in this step are the symmetry of the region, the entropy of the region, the edge density of the region, and various combinations of the ratio of horizontal/vertical edges to the total number of edge pixels. In the present embodiment, a feed-forward neural network having two hidden layers of size 17 and 5 neurons, respectively, and configured to evaluate 10 feature values to determine a symmetry value, is used to perform the classification of each potential ROI. It should be appreciated that in an alternate embodiment, a neural network having more of fewer hidden layers, more or fewer neurons may be employed to classify regions of interest. In still another alternate embodiment, more or fewer than 10 feature values or characteristics of the potential regions of interest may be used to classify the regions of interest. In still another alternate embodiment, circuitry other than a neural network is used to perform the classification, such as, for example, a microcontroller executing a software algorithm.

As noted above, the difference between the strong and weak ROI classifications is that for a weak ROI, or a non-ROI, processing of the image regions above the weak ROI, or non-ROI, is continued, while for regions above a strong ROI, further processing is discontinued. The output of this step is the location of strong and weak ROI locations in the image, along with the symmetry values and other characteristics associated with each of the strong ROI and weak ROI regions.

In a next step 112 of the method 100, the borders of the strong and weak ROI regions identified in the previous step are refined. This is accomplished by slightly varying the size and location of the areas for which symmetry has been calculated for each of the identified strong ROI and weak ROI areas. As the size and location is varied, the values of symmetry and entropy of the varied areas is compared to identify the varied area having highest symmetry and/or lowest entropy. Areas having the highest symmetry and/or lowest entropy are indicative of areas that more closely align with potential vehicles in the image. If a varied area having a higher symmetry and/or lower entropy than the original area is identified, the new area is retained as the area associated with that particular region of interest, be it a strong region of interest or a weak region of interest. The locations of the resulting strong and weak regions of interest are provided to additional processing circuitry, along with characteristics of those regions of interest. The additional processing circuitry then uses that information to identify vehicles in the input image.

It should be appreciated that by discontinuing further processing above strong regions of interest, the performance of a system can be improved relative to the performance of a system that processes regions of interest in an image above areas where strong regions of interest have already been identified.

The inventors have recognized that this approach is appropriate from the point of view of collision warning detection using video images. Because an important vehicle, in terms of collision warning, is defined as being any completely visible vehicle in the same lane or the two adjacent lanes of the host vehicle, any vehicle that is completely visible, but is in the same lane, and ahead of another completely visible vehicle, is not considered as an important vehicle. In the present invention, a strong or weak ROI location that is above an already detected strong ROI location can be indicative of a vehicle that is visible, but is in the same lane and ahead of another completely visible vehicle. Because these vehicles are not viewed as being important from a collision warning standpoint, it is appropriate to stop processing areas above a strong ROI location once a strong ROI location has been identified, resulting in a reduced total processing time for the image.

As discussed above, the present invention advantageously provides for a method for identifying vehicles in an image using edge detection and symmetry detection measures in an efficient manner, based on expected geometric characteristics of vehicles located in an image. The present method reduces search and computation requirements, resulting in a fast, vision-based detection system that does not require the use of radar and the cost and complexity associated with combining radar with vision systems.

The above description is considered that of the preferred embodiments only. Modifications of the invention will occur to those skilled in the art, and to those who make or use the invention. Therefore, it is understood that the embodiments shown in the drawings and described above are merely for illustrative purposes, and not intended to limit the scope of the invention, which is defined by the following claims, as interpreted according to the principles of patent law, including the doctrine of equivalents.

The invention claimed is:

1. A method for identifying objects in an electronic image, comprising the steps of:
using a camera for providing an electronic source image generated with an array of pixels;
using a processor for:
electronically processing the electronic source image to identify edge pixels that make up edge segments of the electronic source image;
providing an electronic representation of the edge pixels that make up corresponding edge segments of the electronic source image; and
processing the electronic representation of the edge pixels to identify valid edge center pixels in at least one row and provide an electronic representation of the valid edge center pixels, wherein each valid edge center pixel is the approximate horizontal center of a horizontal edge segment of essentially contiguous edge pixels having a target width.

2. The method of claim 1, further comprising the step of determining symmetry values for test regions in the electronic source image, wherein the location of the test regions in the electronic source image is based on the location of valid edge center pixels in the electronic representation of valid edge center pixels, and wherein each test region is bounded on the bottom by a horizontal edge segment of essentially contiguous edge pixels centered on a valid edge center pixel, and wherein each test region is approximately rectangular, and has a predetermined height measured from the bottom of the test region.

3. The method of claim 2, wherein a symmetry value of a test region is determined by multiplying individual pixels of the test region by corresponding individual pixel values of a mirror image of the test region, adding the products of the multiplication together, and normalizing the sum to provide a symmetry value for the test region.

4. The method of claim 3, wherein a filtered version of the test region and a mirror image of the filtered version of the test region are used to determine a symmetry value for the test region.

5. The method of claim 2, wherein the horizontal edge segment of essentially contiguous edge pixels centered on a valid edge center pixel has a width approximately equal to an expected width of a vehicle image in the row in which the horizontal image edge segment is located, and wherein the predetermined height is an expected height of a vehicle image having the expected width.

6. The method of claim 2, further comprising the step of identifying for at least one segment of essentially contiguous edge pixels a symmetrical valid edge center pixel associated with the test region having the highest symmetry value.

7. The method of claim 6, further comprising the step of classifying test regions associated with symmetrical valid edge center pixels to identify test regions of interest, wherein a test region of interest is a test region having characteristics consistent with an object to be detected.

8. The method of claim 7, wherein the characteristics of a test region of interest include at least one of high symmetry and low entropy.

9. The method of claim 7, wherein test regions are classified on a row-by row basis moving from bottom-to-top in the image, and wherein test regions located above already classified test regions of interest are not classified.

10. The method of claim 7, further comprising the step of programming a neural network, wherein the neural network is used to classify the test regions.

11. The method of claim 10, wherein the factors used by the neural network to classify a test region include at least one of the symmetry of the region, entropy of the pixels in the region, ratio of edge pixels in the region to total edge pixels in the region, and the ratio of edge pixels in the region to the number of pixels in the region.

12. The method of claim 7, wherein test regions are classified as strong regions of interest, weak regions of interest, and regions of non-interest, and wherein classification of test regions is discontinued in areas above strong regions of interest.

13. The method of claim 7, further comprising the step of refining the boundaries of identified test regions of interest to create refined regions of interest having at least one of higher symmetry or lower entropy relative to unrefined identified test regions.

14. The method of claim 13, wherein the boundaries of identified test regions of interest are refined by altering at least one of the width, height, aspect ratio, vertical location and horizontal location of the identified test region of interest.

15. The method of claim 13, further comprising the step of providing an indication of the location and size of the refined regions of interest to additional processing circuitry for processing to identify vehicles.

16. The method of claim 1, further comprising the step of filtering the electronic representation of the source image by rows to remove from the electronic representation of the image at least one of angled image edge segments having an angle greater than a predetermined angle value and horizontal image edge segments having a length substantially greater than a predetermined width.

17. The method of claim 16, wherein the predetermined angle value is 5 degrees, and wherein the predetermined width is approximately 2.5 times the width a vehicle image is expected to have in the row in which the horizontal image edge segment is located.

18. The method of claim 1, wherein the electronic representation of edge pixels comprises a two-dimensional matrix of values indicating which locations in the electronic source image are edge pixels.

19. The method of claim 1 further comprising the step of vertically thickening identified edge pixels associated with edge segments of the electronic source image prior to identifying valid edge center pixels by causing pixels at least one of immediately above and immediately below identified edge pixels to take on the value of an edge pixel in the electronic representation of edge pixels.

20. The method of claim 1, wherein the step of processing the electronic representation of the edge pixels to identify valid edge center pixels in at least one row is accomplished on a row-by-row basis, and comprises the steps of applying a sized edge pixel filter to each pixel in a given row and determining, based on the filter output, whether each pixel is a valid edge center pixel, wherein the sized edge pixel filter is an array of numbers normalized to sum to 1, and wherein the width of the sized edge pixel filter has a width equal to the expected width in pixels of a vehicle image in the row being processed.

21. A method for identifying features in an electronic image, comprising the steps of:
using a camera for providing an electronic source image generated with an array of pixels;
using a processor for:
processing the electronic source image to identify edge pixels that make up edge segments of the electronic source image;
determining which of the identified edge pixels in at least one row are target edge pixels at the approximate horizontal center of a horizontal edge segment of essentially contiguous edge pixels having a target width;
determining symmetry values for test regions in the electronic source image, wherein the test regions are located relative to corresponding target edge pixels, and wherein size of the test regions is a function of the row in which the corresponding target edge pixels are located;
comparing determined symmetry values of test regions in the electronic source image that correspond to a segment of essentially contiguous edge pixels having a target width to identify the test region having the highest symmetry value; and
classifying test regions having the highest symmetry value to identify test regions of interest, wherein a test region of interest is a test region comprising image characteristics consistent with the presence of a type of object in the source image that is to be detected.

22. The method of claim 21, further comprising the step of refining the boundaries of identified test regions of interest to create refined regions of interest that more closely correspond in at least one of size and shape to objects to be detected.

23. The method of claim 22, further comprising the step of providing an indication of the location and size of the refined regions of interest to additional processing circuitry for processing.

24. A method for identifying potential vehicle regions in an electronic image, comprising the steps of:
using a camera for providing a source image generated by an array of pixels including at least one vehicle to be detected;
using a processor for:
electronically processing the source image to provide an edge image including edges corresponding to the edges of objects in the source image, wherein the edge image edges comprise edge pixels;
removing edges from the edge image that are angled by a predetermined amount relative to horizontal;
vertically thickening edges in the edge image;
removing edges from the edge image that are longer than a maximum length; and
identifying potential vehicle base edges in a row of the edge image, wherein a potential vehicle base edge is a horizontal edge of essentially contiguous edge pixels in the row, and wherein the horizontal edge has a width that is approximately equal to an expected width of a vehicle in the row.

25. The method of claim 24, further comprising the step of identifying at least one vehicle test region in the source image and determining a symmetry value for the at least one vehicle test region, wherein the at least one vehicle test region is rectangular in shape and has a bottom that corresponds in location and width to a potential vehicle base edge, and wherein the at least one vehicle test region has a height that is a function of the width of the potential vehicle base edge.

26. The method of claim 25, further comprising the step of comparing the symmetry value of the at least one vehicle test region to a symmetry value of at least one other vehicle test region in the same row to identify which of the compared vehicle test regions has the highest symmetry value.

27. The method of claim 26, further comprising the step of evaluating at least one characteristic of at least one vehicle test region having the highest symmetry value and classifying the at least one vehicle test region as a vehicle region of interest if the at least one characteristic meets at least one predetermined criteria indicative of a vehicle being present in the at least one vehicle test region.

28. The method of claim 27, further comprising the step of altering at least one of a border and location of a vehicle region of interest to provide a refined vehicle region of interest that more closely corresponds to at least one of the size and shape of vehicle in the source image.

29. The method of claim 28, further comprising the step of providing an indication of the location and size in the source image of a refined region of interest to additional processing circuitry configured to detect vehicles in the source image.

* * * * *